United States Patent [19]

Hiles

[11] Patent Number: 4,808,469
[45] Date of Patent: Feb. 28, 1989

[54] ENERGY ABSORBING POLYURETHANE COMPOSITE ARTICLE

[76] Inventor: Maurice Hiles, 234 Silver Valley Blvd., Munroe Falls, Ohio 44262

[21] Appl. No.: 732,389

[22] Filed: May 9, 1985

[51] Int. Cl.$^4$ .......................... B32B 3/26; B32B 7/10; B32B 27/40
[52] U.S. Cl. ..................... 428/318.6; 36/44; 428/319.3; 428/420; 428/423.3
[58] Field of Search .......................... 36/30 R, 31, 44; 428/71, 76, 309.9, 316.6, 318.6, 319.3, 322.7, 420, 423.3

[56] References Cited

U.S. PATENT DOCUMENTS

| | | | |
|---|---|---|---|
| 3,847,720 | 11/1974 | Laberinti | 428/315.7 |
| 3,935,044 | 1/1976 | Daly | 428/319.3 |
| 4,374,172 | 2/1983 | Schwarz et al. | 428/308.4 |
| 4,418,483 | 12/1983 | Fujita et al. | 428/316.6 |
| 4,455,340 | 6/1984 | Okina | 428/318.6 |
| 4,510,702 | 4/1985 | Ehrlich, Jr. | 36/31 |
| 4,515,851 | 5/1985 | Johnson | 428/316.6 |
| 4,552,817 | 11/1985 | Uustalu | 428/424.2 |
| 4,674,204 | 6/1987 | Sullivan et al. | 36/44 |

Primary Examiner—William J. Van Balen
Attorney, Agent, or Firm—Fay, Sharpe, Beall, Fagan, Minnich & McKee

[57] ABSTRACT

The present invention relates to a light weight energy absorbing and damping device having a predetermined configuration, which is a composite of a foam element, and at least one visco-elastic element, each said visco-elastic element being permanently affixed by chemical bonding in a portion of the device through which energy is normally transmitted. The device may be configured to all or part of a shoe part or insole, a glove, a seat or seat pad, a helmet or helmet liner, a dash-board liner, head support pad or other energy absorbing or protection devices.

19 Claims, 3 Drawing Sheets

ENERGY ABSORBING POLYURETHANE COMPOSITE ARTICLE

BACKGROUND OF INVENTION

The present invention relates to energy absorbing devices formed by producing a composite of a relatively low density polymeric foam and an energy absorbing visco-elastic polymer, and more particularly to an energy absorbing article formed from a relatively low density foam and having a visco-elastic portion permanently fixed in the area or areas of the article through which the greatest quantities of energy are normally transmitted.

In many energy absorbing applications an article having a relatively large surface area is employed to absorb energy, even though most of the potentially damaging energy is transmittable only through a relatively small portion of that overall area. For example, it is known to use energy absorbent material to provide a full footwear insole inside shoes to reduce transmission of vibration to the foot and leg, yet potentially harmful vibration is generally only transmitted at the heel and at the metatarsal heads. This is also true of other energy absorbent devices such as gloves, (where only limited areas of the fingers and palms are usually involved) chair and seat pads, helmets and similar protective headgear, and the like. Such applications have many similarities, but they are also distinctly different. Truckers, for example, experience sustained vibration to the hands from the steering wheel, to the foot from the fuel pedal, and to the spine from the cab/seat vibration. All of these vibrations are different, but all are damaging. Still further applications include facia boards and protection areas of motor vehicles such as arm rests, head rests, dash-board tops and the like. It will, therefore, be understood that while much of the explanation and illustration which follows is directed to insole applications, the present invention is in no way limited to insoles or to footwear.

While it is common to refer to these applications as "energy absorbing," they are in fact more correctly "vibration damping" in many cases. This is particularly true in almost all cases of the most severe types. Thus, the absorption or softening of a single impact can often be satisfactorily accomplished using foams or the like. When there is a continuing series of impacts, however, there is a continuing series of energy transmissions and these become basically vibratory in nature. As such, they are not really effectively absorbed by materials such as foams and, therefore, must in effect be dampened.

Foam type energy absorbing footwear components are of course well known, but they suffer well known deficiencies. When made of foam the insoles have a high compression set which renders the device ineffective, often in a relatively short period. Often also if the foam is of an open cell structure it can provide an ideal breeding ground for bacteria and fungi. Some dense materials such as polyurethane and styrene butadiene rubber have also been used and some are even known to have some visco-elastic properties. However, they generally have a density greater than unity often at least 1.2.

Also, it is often necessary to tailor the visco-elastic properties of this device to the end use. In footwear applications, for example, if the desired effect is to be obtained it is essential to achieve recovery before the next step. While this is usually less than 0.7 sec., in fact, optimum recovery time is different for walking applications (about 600 to 1000 milliseconds), joggers (about 100 to 600 milliseconds), and runners (about 15 to 40 miliseconds). In any case it must be remembered that damping is generally non-linear, and that there must be some delay between recovery and the next step, otherwise there may be resonance.

My earlier patent applications have disclosed and claimed certain novel polyurethene compositions which are "visco-elastic," in nature. That is to say that are solid devices, formed from elastomeric polymers, which act to dampen the transmission of energy in much the same manner as if they contained a viscous liquid. First they distort easily and so distribute the load over the maximum area—like catching a ball in the palm of the hand rather than the tip of a finger; then on compression they become progressively stiffer like a spring, except that unlike a spring they pause for a fraction before recovering, which eliminates resonance and may facilitate a frequency change.

Extremely effective devices have been formed from visco-elastic polymers, but they have one potentially serious disadvantage in applications where weight is at a premium. They have a relatively high density. The density of formed visco-elastic devices is generally in the range of from about 0.8 to about 2.0 and is typically about 1.34. It will be apparent that in appliations such as insoles for athletic and running shoes where visco-elastic polymers offer particularly advantageous performance characteristics, their weight is often as much as twice that of the foam insole they generally replace.

Attempts to produce a composite insole having lightweight overall foam construction; with visco-elastic elements at the heel and/or the ball of the foot, have proven singularly unsuccessful. Similar lack of success has been encountered in attempts to produce components of visco-elastic elements and leather, felt, or other overall insole substitutes. Mechanical or chemical adhesives sometimes provide seemingly adequate initial adhesion, but after a very brief period of use, the visco-elastic portion either separates from the main insole structure, or is displaced in such a way that it is rendered inefficient, if not effectively inoperative.

One purpose of the present invention is to provide a composite energy absorbing device having an average density less than about 0.5, having visco-elastic inserts permanently affixed on those areas of the device which are subject to particularly severe or resonant vibratory energy.

Another purpose of the present invention is to provide a lightweight footwear component having an average density no greater than about 0.5, composed of a foam element with inserts of an energy absorbing visco-elastic polymer molded in the critical portions of the component, such as the heel, the metatarsal heads and/or the longitudinal arch.

A further purpose is to provide a means whereby in use such component assists aeration of the foot, and is formed from materials which do not harbor or encourage the growth of bacteria and fungi.

SUMMARY OF INVENTION

The present invention provides novel composite energy absorbing devices comprising a light weight foam portion formed in a desired predetermined configuration, having at least one visco-elastic polymer insert in the principal area where energy is transmitted, said visco-elastic insert being chemically bonded to said foam portion. The composite may also include additional components or related elements, such as for example a fabric or leather liner layer on top of an insole composite, a leather outer wear surface in a glove composite, or a fabric or other cover for seat composites.

Again, using an insole/footwear application as an example, the insole or component of the lower portion of any footwear may be a complete or part insole, a heel or forefoot piece, a midsole or part thereof, that is constructed of a foamed elastomer and a visco-elastic polymer molded in such a way that there is a permanent chemical and or physical bond between the mating surface. The composite may be flat or may be contoured to conform with the plantar surface of the foot. A forefoot piece may also be contoured in the same way, as may a heel piece which might vary in thickness to maximize its energy absorbing properties and which may be cupped on the upper surface to enhance gait stability.

The entire composite may be solid, or it may be pierced by a single hole or a multiplicity of holes, grooves or channels; the purpose of such holes, channels or grooves is to increase surface areas, to further decrease the weight of the component, and to enable air to travel from the lower to the upper surface or vice versa. This, can assist in the cooling of the foot and transmitting of moisture away from the surface of the foot, thereby aiding the comfort of the wearer. A further advantage of using holes, can be to increase the energy absorption capability, by restricting the passage of air through such holes. In such a case the vents should be designed so that one orifice of each hole is substantially smaller than the other.

A further advantage to the use of holes is to provide a means hereby, in use, the composite assists aeration of the foot. In footwear applications, the composite must function in temperature ranges that are commensurate with leisure, working, and athletic activities in all climates. Also it is desirable that the components do not harbor or encourage the growth of bacteria and fungi.

By flexible foam is generally meant a polymeric elastomer containing a multiplicity of cells which may be discreet (closed cell) or interconnecting (open cell). Discreet cells contain a "fluid" which may be a liquid or a gas. Suitable gases are well known to those skilled in the art and include air, carbon dioxide, nitrogen, hydrogen, argon, freon and the like. Suitable liquids are water and low viscosity oils. The elastomers may be any suitable polymer such as for example: silicone rubber, polyvinyl chloride, polyethylene, polypropylene, polyurethane, expoxys or the like. Suitable rubbers include for example: natural rubber, neoprene, styrene butadiene and olefin copolymers containing rubber.

The properties of the visco-elastic polymer must be such that it distorts easily so that an applied load is spread over the maximum area; as the load is applied it must afford constant and progressive resistance until the system approaches equilibrium; there must be a micropause between the compressive and relaxation phases to minimize rebound; it must return to shape in a suitable time so that the process may be continuous if necessary; and it must be capable of resisting multi-directional forces.

DRAWINGS

PREFERRED EMBODIMENT

The preferred composite devices of the present invention have an overall density of from about 0.25 to about 1.0, and are produced from polyurethane foam, and polyurethane visco-elastic polymers.

The preferred visco-elastic material is polyurethane, which may be formed by reaction between a suitable diisocyanate and a polyether or a polyester. Such compositions are described in my earlier U.S. Patents and patent applications including: U.S. Pat. No. 4,346,205, U.S. Pat. No. 4,476,258, U.S. applications Ser. No. 550,192 filed Nov. 9, 1983, now abandoned and Ser. No. 668,287 filed Nov. 5, 1984, now abandoned. The specifications and claims of said prior patents and patent applications are specifically incorporated herein by reference.

The preferred foam is a polyurethane foam, which may be a reaction between a polyether or a polyester, and a suitable aromatic diisocyanate, such as 4'4' diphenylmethane diisocyanate (sold by Mobay Chemical Corp. under the tradename Mondur CD). A polyether is generally preferred since it is less hygroscopic and it does not require the use of elevated temperatures such as may be necessary to process polyesters, i.e., some in excess of 150° F. A suitable polyether is sold by Mobay Chemical Corp. under the trade designation NB 337230E (typical spec. molecular wt. 4000; Hydroxil No. 28; Acid No. 1; Free foam density 0.2; Stoichimetric ratio OH-1 NCO.1; Actual Ratio OH-1 NCO 1.1).

The cured foam generally has a density of 0.1 to about 0.4 and a Shore Hardness (00) of about 5 to 30.

Figure 1:
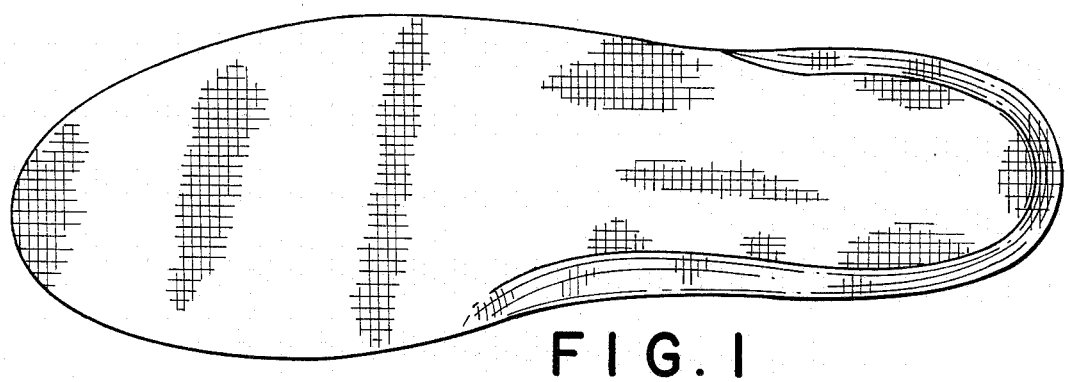
FIG. 1 is a top view of an insole composite within the scope of the present invention.
Figure 2:
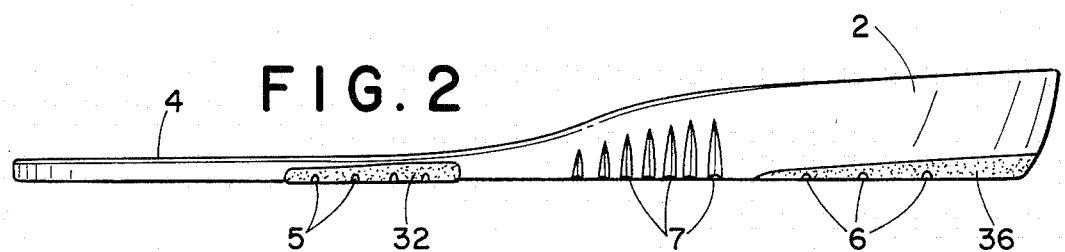
FIG. 2 is a side view of the insole of FIG. 1.
Figure 3:
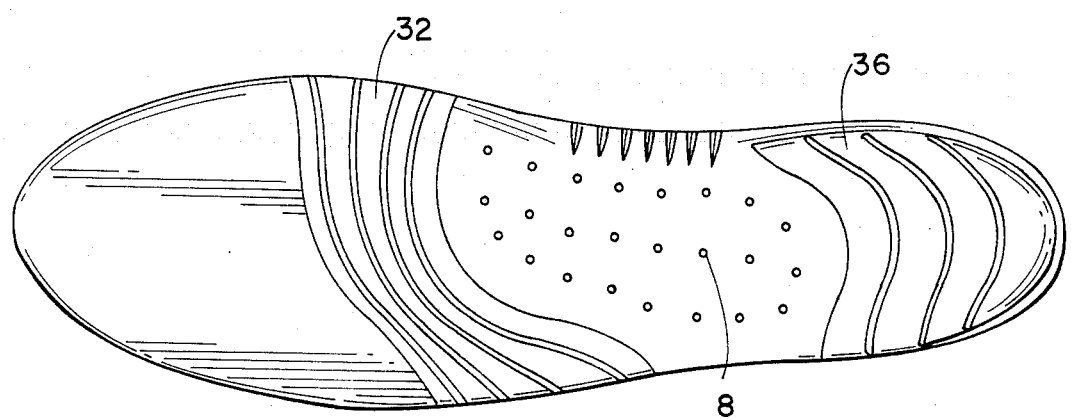
FIG. 3 is a bottom view of the insole of FIG. 2.
Figure 4:
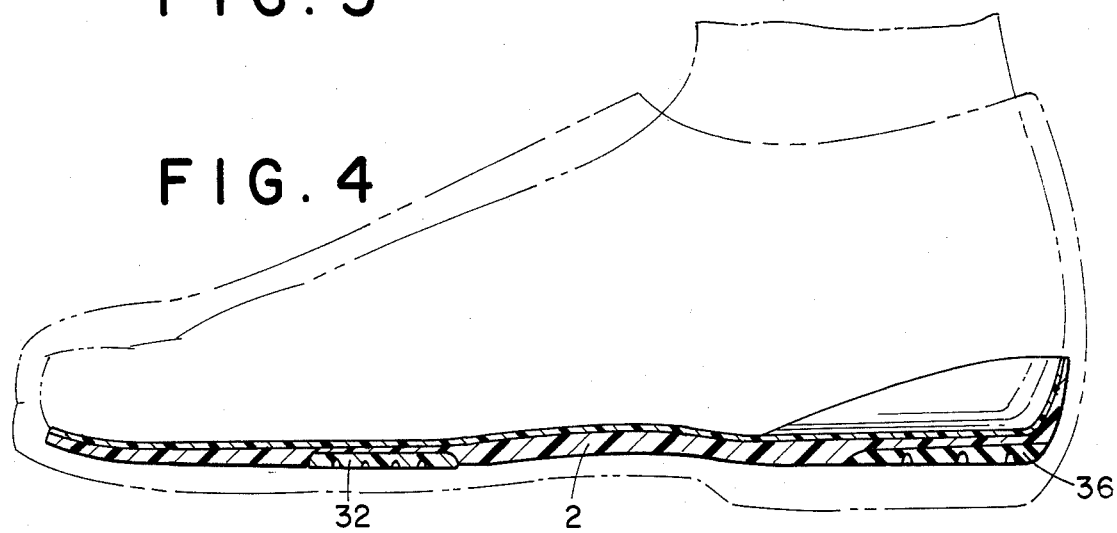
FIG. 4 illustrates the insole of FIG. 1–3 as used.

In the preferred composites of the present invention the foam element is prepared from a formulation having a stoichiometric excess of isocyanate groups, and the visco-elastic element is prepared from a formulation having stoichiometric excess of hydroxyl radicals, so that in forming the cured composite, polyurethane bonds will be created between the foam element and the visco-elastic element, permanently fixing the placement of the visco-elastic element in the overall composite. While this is the preferred stoichiometry, it will of course be understood that equally advantageous results can be obtained when the stoichrometry is reversed, i.e., the visco-elastic element has a stoichiometric excess of issocyanates, and the foam has a stoichiometric excess of hydroxyl radicals In the drawings, FIG. 1 illustrates the top view of an insole component within the scope of the present invention. As illustrated in FIG. 2, 3 and 4 insole 1 of FIG. 1 is a composite of foam element 2 having two visco-elastic elements 32 and 36 and a liner element 4 which may be fabric, leather or other suitable material. There are a series of grooves or channels 5 in visco-element 32 and a further series of grooves 6 in the visco-elastic element 36, to provide for the passage of air and the other advantages set forth hereinbefore. There are a series of smaller grooves 7 and a series of orifice holes 8 in the foam element 2 to provide similar advantages.

Figure 5:
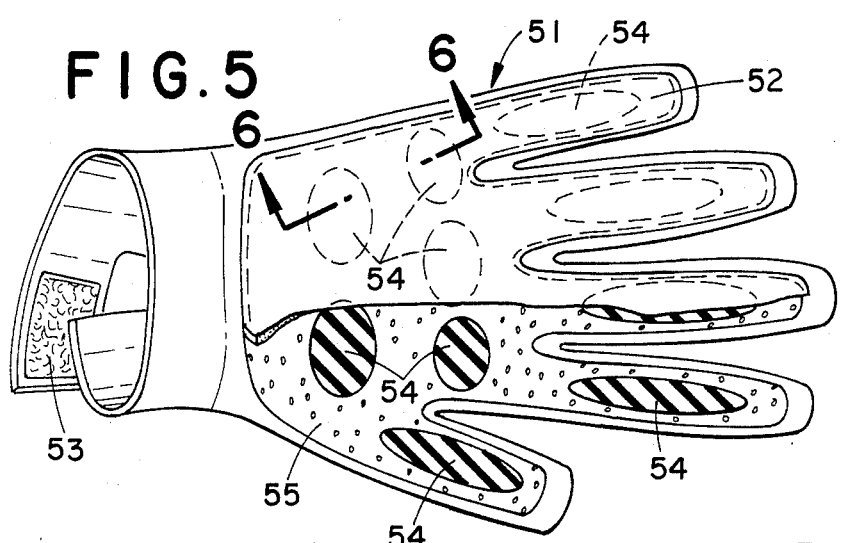
FIG. 5 is a partial cut away view of a glove composite within the scope of the present invention.
Figure 6:
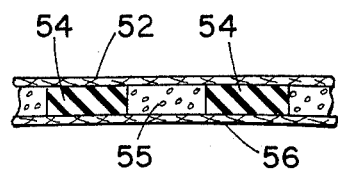
FIG. 6 is a cross section of the glove composite of FIG. 5.
Figure 7:
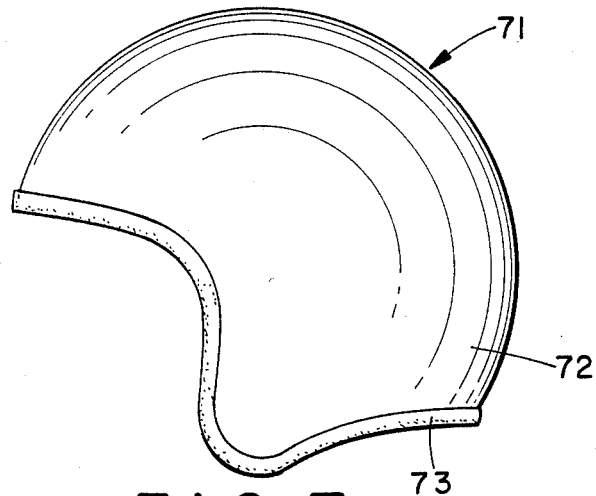
FIG. 7 is a side view of a helmet containing a helmet liner composite within the scope of the present invention.

FIG. 5 and 6 illustrate the vibration absorbing glove within the scope of the present invention. As illustrated in FIG. 5 a glove 51 has a principal wear layer 52, with suitable closure means 53, such as a Velcro (TM) device or the like, and a reinforced palm area having visco-elastic element 54, foam element 55 and an optional liner element 56. Wear surface 52 and liner element 56, may be the same or different, and may be leather, fabric or other synthetic material, and while each is generally stitched in place, they may be assembled in any suitable manner. Alternatively, the principal material used in forming the wear layer 52 can be a foam of the type hereinbefore described, and the visco-elastic polymer can be directly bonded in place within the foam element. Also, a wear resistant polyurethane could be employed as wear surface 52, and could be bonded to visco-elastic element 54 or foam element 55 by providing one of said elements with a stoichiometric excess of hydroxyl radicals, and the other with a stoichiometric excess of isocyanate radicals.

FIG. 6 is a cross section of glove 51 on the line 6—6 of FIG. 5.

Figure 9:
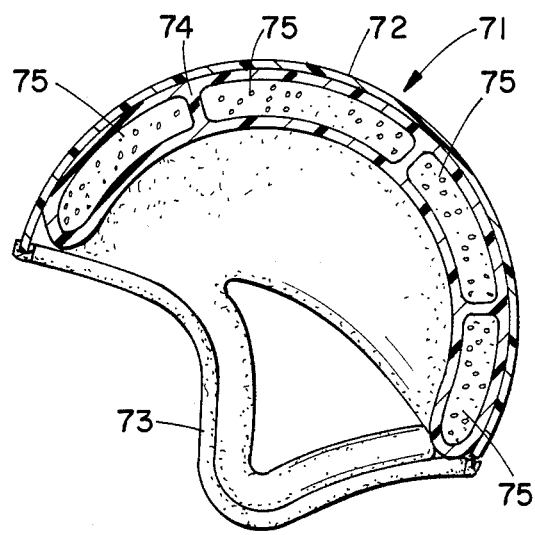
FIG. 9 is a side cross section of the helmet and liner of FIG. 8.
Figure 8:
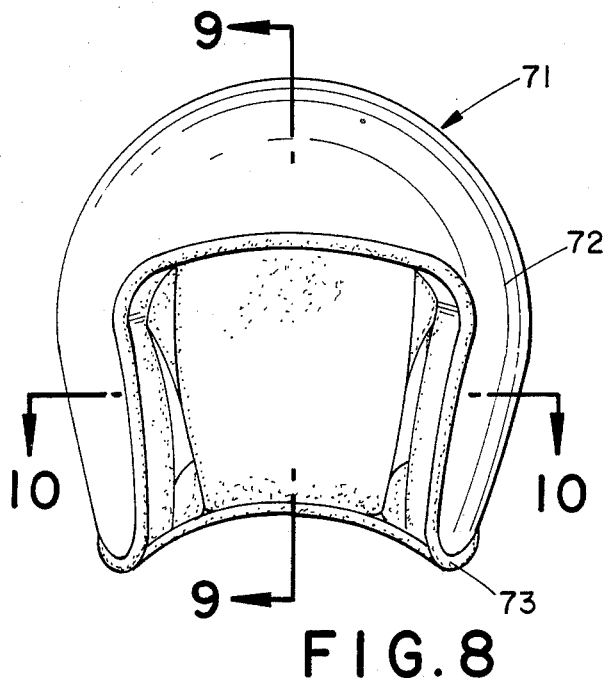
FIG. 8 is front view of the helmet of FIG. 7.
Figure 10:
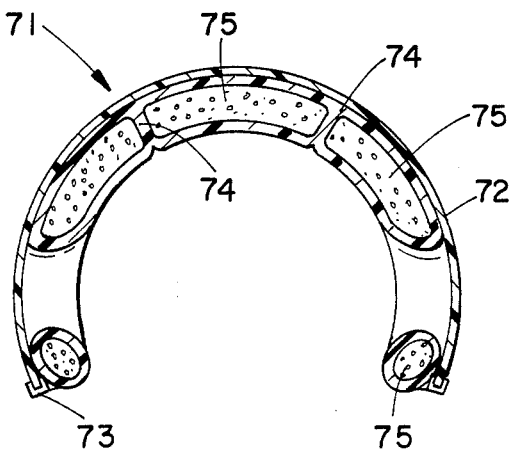
FIG. 10 is a top to bottom cross section of the helmet and liner of FIG. 8.
Figure 11:
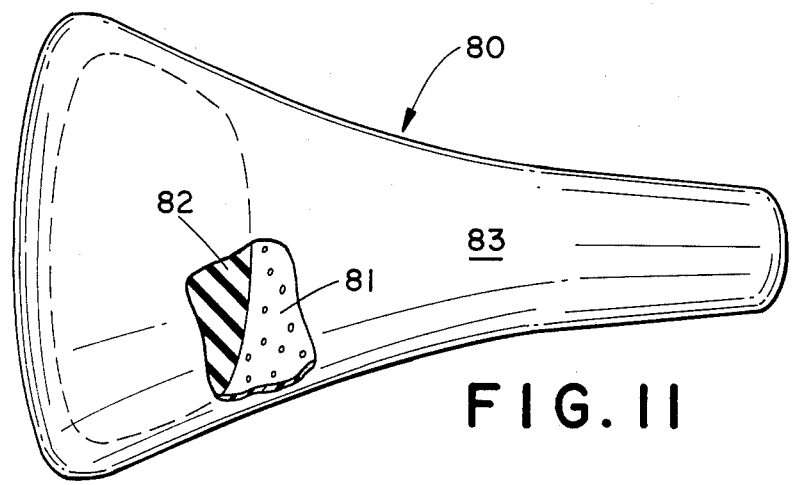
FIG. 11 is a bicycle type seat composite within the scope of the present invention.
Figure 12:
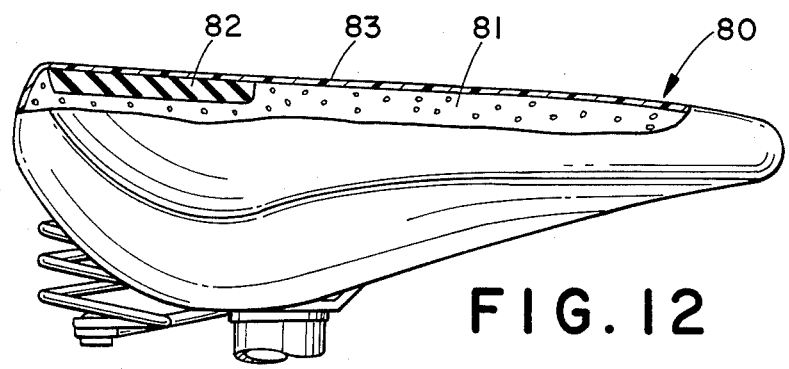
FIG. 12 is a side view of the seat of FIG. 11.
Figure 13:
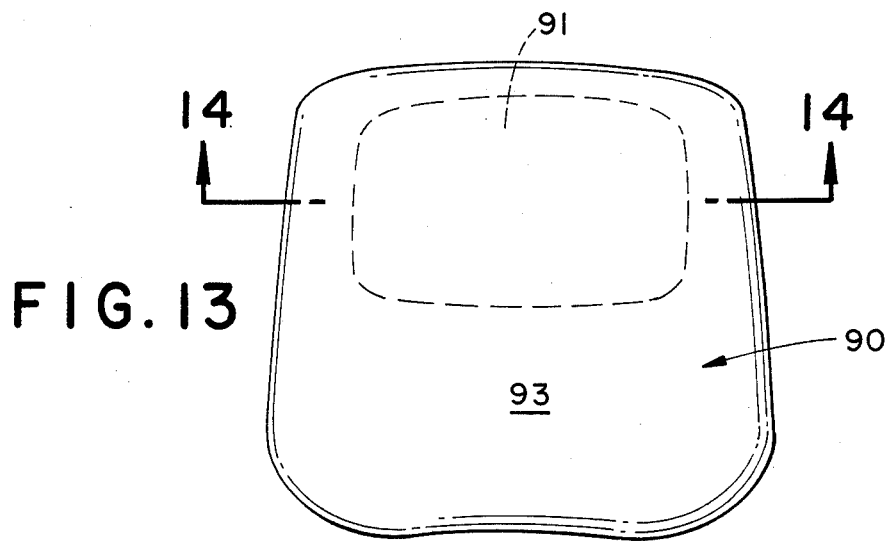
FIG. 13 is another seat cushion composite within the scope of the present invention.
Figure 14:
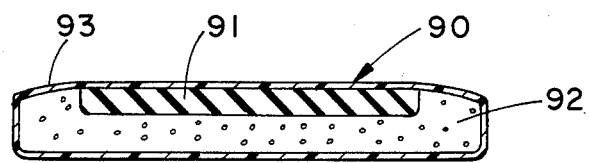
FIG. 14 is a side view of the seat of FIG. 13.

FIG. 7 through 10 illustrate a helmet or headgear device of the type within the scope of the present invention. As illustrated helmet 71 has an outer helmet shell 72 and a helmet liner 73 (as shown in FIGS. 9 and 10) being composed of a foam element 74 in which a plurality of visco-elements 75 are held in place and chemically bonded. It should be specifically noted that with regard to helmet 71, the placement of the visco-elastic elements within the helmet liner 73 will be a function of the protective use for which the helmet is intended. For example, the helmet protection would be different for an application such as motorcycles as opposed to football as opposed to automotive racers since the specific area of impact and type of impact would differ from application to application. FIGS. 11 and 12 illustrate a bicycle type seat composite within the scope of the present invention wherein seat 80 is composed of outer wear layer 83 foam element 81 and visco-elastic element 82. FIG. 12 is a side view of the seat embodiment of FIG. 11. FIG. 13 illustrates another seat embodiment, of the type particularly useful in applications such as automotive or truck seatpads, wheelchair or other seat pads. As illustrated in FIG. 13 and 14, seat 90 has a visco-elastic element 91, foam element 92, and optional cover 93 which may be of natural or synthetic fabric, or other suitable material, and may be permanently affixed in a place or may be removable for ease of cleaning or replacement.

As in the case of head gear embodiments, the actual location of the visco-elastic element will vary greatly, according to the specific end use, i.e., bicycle seats will differ from truck seat composites, which in turn will differ from wheel chair seat composites. In general, however, seat composites will have the visco-elastic elements positioned to absorb energy which would otherwise be transmitted to the area of the coccyx or sternum or base of the spine and/or the tip of the illiac or hip bone. For this reason it will be understood that while all the drawings are illustrative only, this is particularly true of FIGS. 7–14.

The following examples will serve by way of illustration and not by way of limitation to describe the fabrication of one of the preferred footwear composites within the scope of the present invention.

EXAMPLE 1

Suitable visco-elastic inserts are manufactured in accordance with Example IV of U.S. Pat. No. 4,476,258. Such polyurethanes contain a number of free, that is unreacted, hydroxyl radicals some of which are available on the surface. The parts are then placed in a mold at room temperature, and foam poured on top and the mold is then closed. Demolding takes place after three minutes. The foam is made by reacting a polyether such as Mondur NB 337230 with a diisocyanate, such as Mondur CD. in an amount greater than the OH-NCO stoichiometric ratios. The excess NC radicals react with the available free hydroxyl radicals on the surface of the visco-elastic polymer forming a chemical bond. Thus, the bond strength is far greater than would normally be obtained by mating the two components conventionally or by employing a suitable adhesive.

EXAMPLE 2

A procedure as in Example 1 except that the visco-elastic components are reacted in the same mold thus ensuring clearer definition between the two parts in that there is no ingress of foam into the visco-elastic portion.

EXAMPLE 3

A procedure as in Example 1 or 2 but where a suitable fabric is placed on top of the foam before the mold is closed.

EXAMPLE 4

The procedure of Example 1 is repeated, but a chelating agent and metal catalyst of the type taught in Example 1 of co-pending U.S. application Ser. No. 668,287 were incorporated into the visco-elastic component to provide bacteriostatic and fungistatic properties.

It will be apparent to those skilled in the art that various modifications and variations can be made in the polyurethane elastomer compositions and methods of making and using them in accordance with the present invention. Thus, it is intended that the present invention covers the modifications and variations of this invention provided that they come within the scope of the appended claims and their equivalents.

What is claimed is:

1. A light weight energy absorbing and damping device having a predetermined configuration and an overall density of less than 1 which is a composite of a polyurethane foam element, and at least one polyurethane viscoelastic element, each said visco-elastic element being permanently bonded to said foam by the formation of urethane bonds at the interface between said foam element and each said visco-elastic element in a portion of the device through which energy is normally transmitted.

2. The device of claim 1 wherein said foam is prepared from a precursor formulation having a stoichiometric excess of hydroxyl radicals, and said visco-elastic element is prepared from a polyurethane precursor formulation having a stoichiometric excess of isocyanate.

3. The device of claim 1 wherein said foam is prepared from a precursor formulation having a stoichiometric excess of isocyanate radicals, and said visco-elastic element is prepared from a polyurethane precursor formulation having a stoichiometric excess of hydroxyl radicals.

4. The device according to claim 2 wherein said composite is a shoe insole, and said visco-elastic elements are positioned to reduce transmission of energy to the heel and the metatarsal heads.

5. The device according to claim 3 wherein said composite is a shoe insole, and said visco-elastic elements are positioned to reduce transmission of energy to the heel and the metatarsal heads.

6. The device according to claim 2 wherein said composite is a part of a glove, and said visco-elastic elements are positioned to reduce transmission of energy to the palm and finger of the hand.

7. The device according to claim 3 wherein said composite is a part of a glove, and said visco-elastic elements are positioned to reduce transmission of energy to the palm and finger of the hand.

8. The device according to claim 2 wherein said composite is a part of a bicycle seat, and said visco-elastic elements are positioned to reduce transmission of energy to the coccyx.

9. The device according to claim 3 wherein said composite is a part of a bicycle seat, and said visco-elastic elements are positioned to reduce transmission of energy to the coccyx.

10. The device according to claim 2 wherein said composite is a part of a seat pad, and said visco-elastic elements are positioned to reduce transmission of energy to the coxyx and the illiac.

11. The device according to claim 3 wherein said composite is a part of a seat pad, and said visco-elastic elements are positioned to reduce transmission of energy to the coccyx and the illiac.

12. The device according to claim 2 wherein said composite is a part of an arm rest, and said visco-elastic elements are positioned to reduce transmission of energy to the elbow and the shoulder.

13. The device according to claim 3 wherein said composite is a part of an arm rest and said visco-elastic elements are positioned to reduce transmission of energy to the elbow and the shoulder.

14. The device according to claim 2 wherein said composite is a part of a head-neck support, and said visco-elastic elements are positioned to reduce transmission of energy to the neck and the base of the skull.

15. The device according to claim 3 wherein said composite is a part of a head-neck support, and said visco-elastic elements are positioned to reduce transmission of energy to the neck and the base of the skull.

16. The device according to claim 2 wherein said composite is a helmet liner, and said visco-elastic elements are positioned to reduce transmission of energy to the temple, the skull, or the head.

17. The device according to claim 3 wherein said composite is a helmet liner, and said visco-elastic elements are positioned to reduce transmission of energy to the temple, the skull, or the head.

18. The device according to claim 2 wherein said composite has bacteriostatic and fungistatic propeties.

19. The device according to claim 3 wherein said composite has bacteriostatic and fungistatic properties.

* * * * *